US010732345B2

(12) United States Patent
Dirks et al.

(10) Patent No.: US 10,732,345 B2
(45) Date of Patent: Aug. 4, 2020

(54) LIGHT GUIDE WITH ANTI-REFLECTIVE LASER MACHINED COVER

(71) Applicant: Hella KGaA Hueck & Co., Lippstadt (DE)

(72) Inventors: Heinz-Michael Dirks, Lippstadt (DE); Frank Schoening, Rheda-Widenbrueck (DE); Markus Stuhldreher, Olsberg (DE); Andreas Suray, Paderborn (DE); Franz-Georg Willeke, Anroechte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 15/722,612

(22) Filed: Oct. 2, 2017

(65) Prior Publication Data

US 2018/0024288 A1 Jan. 25, 2018

Related U.S. Application Data

(63) Continuation of application No. PCT/EP2016/056919, filed on Mar. 30, 2016.

(30) Foreign Application Priority Data

Apr. 2, 2015 (DE) .................. 10 2015 105 168

(51) Int. Cl.
*F21V 8/00* (2006.01)
(52) U.S. Cl.
CPC ......... *G02B 6/0065* (2013.01); *G02B 6/0043* (2013.01); *G02B 6/0061* (2013.01)

(58) Field of Classification Search
CPC .......... G02B 6/00–0096; G02B 6/0065; G02B 6/0043; G02B 6/0061; G02B 6/0033;
(Continued)

(56) References Cited

U.S. PATENT DOCUMENTS

| 6,467,922 B1 | 10/2002 | Blanc et al. |
| 7,104,678 B2 * | 9/2006 | De Lamberterie .. B60Q 1/0052 362/560 |

(Continued)

FOREIGN PATENT DOCUMENTS

| DE | 442 7606 A1 | 2/1996 |
| DE | 198 60 737 A1 | 7/2000 |

(Continued)

OTHER PUBLICATIONS

International Search Report dated Jul. 26, 2016 (English Translation).

*Primary Examiner* — Bao Q Truong
(74) *Attorney, Agent, or Firm* — Muncy, Geissler, Olds & Lowe, P.C.

(57) ABSTRACT

A light guide for a lighting device, wherein the light guide extends along a longitudinal axis and has a coupling-out area which runs over the longitudinal axis and from which light can be emitted along the longitudinal axis, and wherein the light guide has, in its longitudinal extent, an end region which is provided with a cover in order to suppress high-intensity light emission in the end region. The cover is formed by laser-machining the light guide material in the end region of the light guide. The invention further relates to a method for forming a cover in the end region of the light guide.

11 Claims, 1 Drawing Sheet

(58) Field of Classification Search
CPC .... G02B 6/005; G02B 6/0045; G02B 6/0011; G02B 6/0001; F21V 2200/00; F21V 2200/20
See application file for complete search history.

(56) References Cited

U.S. PATENT DOCUMENTS

| | | | |
|---|---|---|---|
| 8,331,755 B2* | 12/2012 | Chang | G02B 6/001 362/559 |
| 8,616,751 B2* | 12/2013 | Li | G02B 6/4298 362/555 |
| 9,759,855 B2* | 9/2017 | Hayama | G02B 6/0041 |
| 2001/0038539 A1* | 11/2001 | Lea | G02B 6/001 362/551 |
| 2006/0050282 A1* | 3/2006 | de Lamberterie | F21S 43/14 356/452 |
| 2008/0013338 A1* | 1/2008 | Huang | G02B 6/0043 362/606 |
| 2008/0225548 A1* | 9/2008 | Eichelberger | G02B 6/001 362/551 |
| 2010/0103699 A1 | 4/2010 | Gonda et al. | |
| 2010/0128350 A1* | 5/2010 | Findlay | G02B 1/118 359/601 |
| 2010/0253832 A1* | 10/2010 | Duparre | H01L 27/14618 348/360 |
| 2012/0002442 A1 | 1/2012 | Brandt et al. | |
| 2012/0128298 A1 | 5/2012 | Tsao et al. | |
| 2012/0147617 A1 | 6/2012 | Fritz et al. | |
| 2012/0162281 A1* | 6/2012 | Cho | G02B 6/0036 345/690 |
| 2013/0279192 A1 | 10/2013 | Chang et al. | |
| 2014/0003075 A1* | 1/2014 | Yamada | B60Q 1/0035 362/511 |
| 2014/0029292 A1* | 1/2014 | Mizushiro | G02B 6/0038 362/565 |
| 2014/0272329 A1* | 9/2014 | McCollum | G02B 6/0065 428/195.1 |
| 2014/0293190 A1* | 10/2014 | Nakashima | G02B 6/0035 349/65 |
| 2015/0277021 A1* | 10/2015 | Fu | G02B 6/0023 362/612 |
| 2016/0259122 A1* | 9/2016 | Negoro | G02F 1/133308 |
| 2016/0376170 A1* | 12/2016 | Ivan | B29D 11/00721 422/186.3 |

FOREIGN PATENT DOCUMENTS

| | | |
|---|---|---|
| DE | 10 2009 011 948 A1 | 9/2010 |
| DE | 10 2012 108 553 A1 | 3/2014 |
| EP | 2 180 360 A2 | 4/2010 |
| JP | 2002 13 1551 A | 5/2002 |
| JP | 2003 17 7249 A | 6/2003 |
| JP | 2003 28 1920 A | 10/2003 |
| JP | 2014-026829 | 6/2014 |

\* cited by examiner

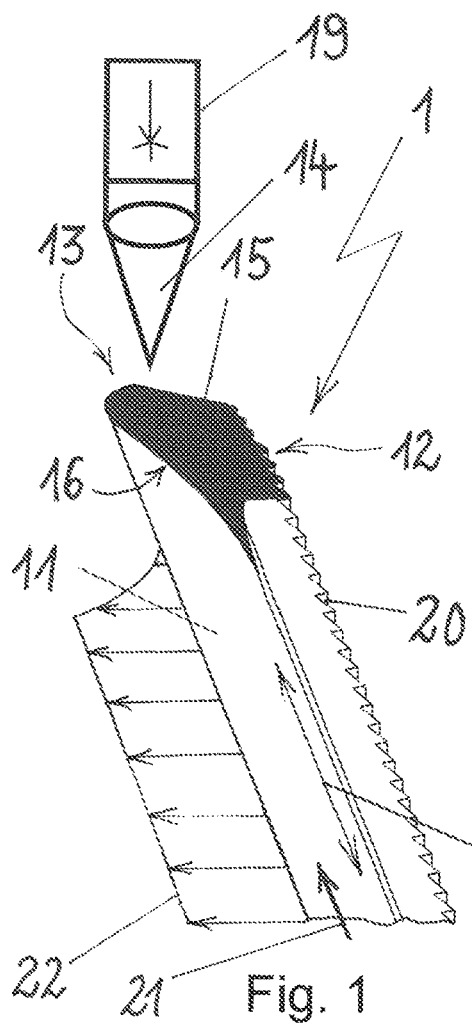
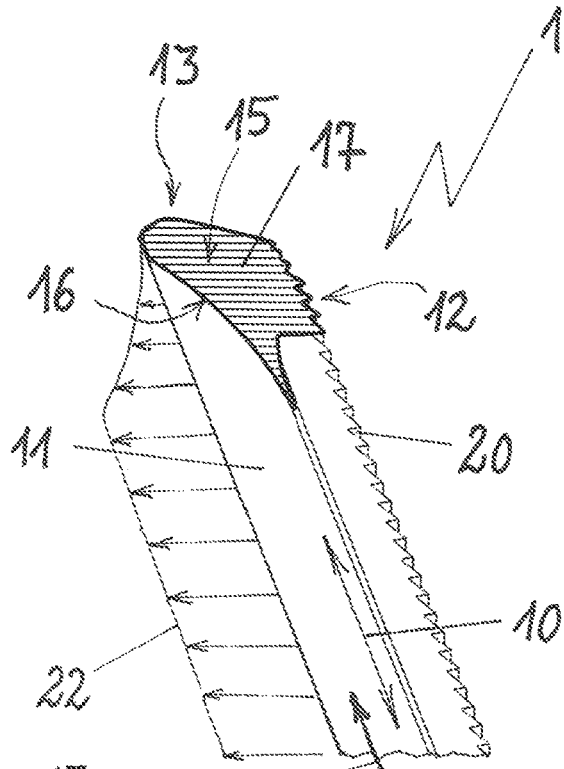
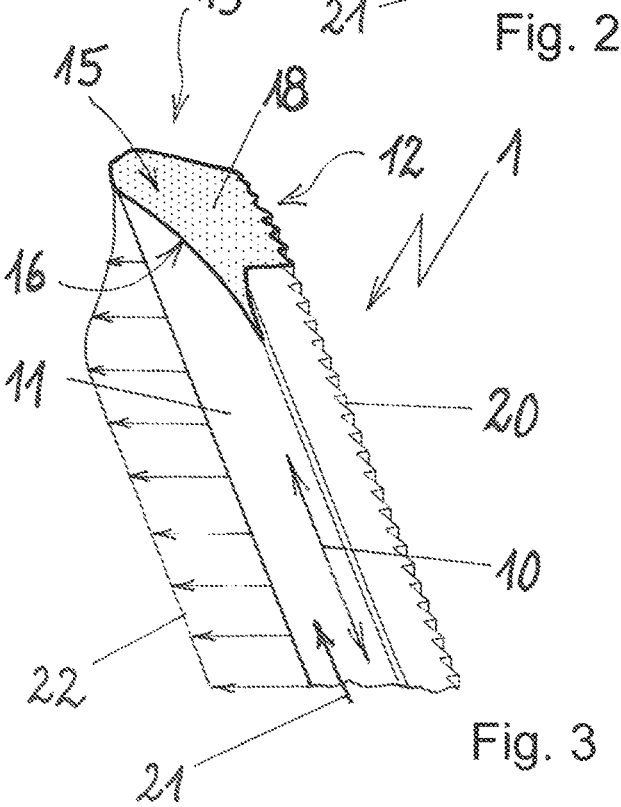

LIGHT GUIDE WITH ANTI-REFLECTIVE LASER MACHINED COVER

This nonprovisional application is a continuation of International Application No. PCT/EP2016/056919, which was filed on Mar. 30, 2016, and which claims priority to German Patent Application No. 10 2015 105 168.0, which was filed in Germany on Apr. 2, 2015, and which are both herein incorporated by reference.

BACKGROUND OF THE INVENTION

Field of the Invention

The present invention relates to a light guide for a lighting device, wherein the light guide extends along a longitudinal axis and has a coupling-out area extending about the longitudinal axis from which light can be emitted along the longitudinal axis, and wherein the light guide in its longitudinal extension has an end region, which is provided with a cover in order to prevent light emission of higher intensity.

Description of the Background Art

Light guides are used for the transmission of light coupled into the light guide, and light guides are known, which have over their longitudinal extension a prismatic structure in order to decouple the light, which was coupled-in, back out as evenly as possible over the length of the light guide. This creates line beams, which serve in particular to fulfill a signaling function of a lighting device for a vehicle. The continuation of the light along the light guide is made by way of total reflection at the interfaces of the light guide, which guide is typically made of a plastic body, for example, polycarbonate. Light which has been guided in the light guide up to the end region exits in an increased manner in the end region because there is an enhanced coupling-out of light through an end face provided in the end region. The enhanced coupling-out of light through the end face is due to exceeding a total reflection angle, since the light is incident on the end face, which is inclined with respect to the longitudinal axis and essentially completely decouples from the latter. Disadvantageously, a decoupling of increased intensity ensues, wherein the intensity is higher than the intensity of the coupled-out light above the coupling-out area, which runs, for example, along or parallel the longitudinal axis of the light guide and to the line emission of the light.

An example of an intentional coupling-out through an end face of a light guide is shown in DE 44 27 606 A1. Light is coupled into a light guide via a light emitting diode, and the light is guided along the light guide to a desired output location. In the end region of the light guide, the latter is defined by an end face, and the end face has a larger angle to the longitudinal axis of the light guide. This angle is dimensioned such that the light is reflected inside the end face, and is finally coupled out via the opposite boundary surface of the light guide.

In order not to visibly carry out a coupling-out via the end face of a light guide when viewed from an outer side of the lighting device, DE 10 2012 108 553 A1 shows a cover in the end region of a light guide, so that light coupled out through the end face is not transmitted and thus remains invisible from the outside of the lighting device. However, such a cover requires a further part, for example, as a component of the light guide receiver, which is not generally available as a function of the installation position of a light guide.

SUMMARY OF THE INVENTION

It is therefore an object of the invention to provide a light guide with an improved cover on one end face of the light guide, in order to prevent light emission of higher intensity in the end region.

In an exemplary embodiment the invention provides that the cover is formed by laser machining the light guide material in an end region of the light guide.

Laser machining of the light guide can cause optical density of the light guide material, through which incoming light is absorbed in the machined area so that it does not reflect. A coupling-out of the light from the light guide is thereby partly or completely prevented. The particular advantage of a laser machined region of the light guide is that for forming the cover, no further part is required, in particular, no further component and also no coating, foil or the like needs to be applied from the outer side to the end region of the light guide. In particular, a component which forms the cover can be omitted.

The laser machining of the light guide material takes place with a laser beam and forms an anti-reflection area. The anti-reflection area is preferably located in the end region of the light guide.

According to an embodiment, the anti-reflection area is formed on one end face in the end region of the light guide. The laser radiation is focused from the outside on the end face, and by a corresponding parameterization of the laser radiation, optical density of the end face can be achieved.

According to an embodiment of the invention, the anti-reflection area is located inside the material of the light guide, in particular adjacent to the end region. By focusing the laser radiation in the material of the light guide, the material can be influenced such with appropriate parameterization of the laser radiation that an anti-reflection area is generated inside the light guide. The particular advantage lies in the specific resistance of the anti-reflection area, especially since further oxidation processes cannot take place.

Advantageously, the anti-reflection area is generated by an oxide layer on or in the material of the light guide. For example, the light guide has a polycarbonate, and an interaction with laser radiation leads to carbonization of the material, which results in optical density. This optical density causes the formation of an anti-reflection area since the light radiation guided in the light guide is absorbed in the area of the carbonization.

When machining material with laser radiation, different approaches can be provided. For example, the end face of the light guide or an internal area in the light guide can be machined over the entire surface or in an inner layer over the entire cross-sectional area with laser radiation, for example, by scanning the laser beam. A scanned laser beam can also act on a surface of the light guide in lines or on dots so that a line structure or, for example, a dot pattern is generated. It can also be provided that a portion of the end face is darkened over the entire surface; another part of the end face is, for example, unmachined. Through targeted machining of an end face with laser radiation, the intensity of light coupled out can also be affected such that said intensity adapts to the intensity of the light that is coupled out over the coupling-out area. This can also prevent light emission of higher intensity in the end region of the light guide.

The invention is further directed to a method of forming a cover of a light guide for a lighting device, which cover is provided in an end region of the light guide in order to prevent light emission of higher intensity in the end region, and wherein the method provides that first, a light guide is provided; further, a laser beam is provided and laser machining of the light guide material takes place in the end region of the light guide in order to create the cover.

The method provides that an anti-reflection area is formed by the laser beam in that an interaction of the laser beam with the light guide material is created.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a partial view of a light guide with an end face, which is darkened over its entire area;

FIG. 2 illustrates the light guide according to FIG. 1, wherein the end face is darkened in lines; and FIG. 3 illustrates the light guide according to FIG. 1, wherein the end face is darkened in a dot pattern.

DETAILED DESCRIPTION

FIGS. 1, 2 and 3 respectively show a light guide 1 with a different embodiment of a cover 13 formed according to the invention in the end region 12 of the light guide 1. The light guide 1 extends along a longitudinal axis 10 and over the longitudinal axis 10, the light guide 1 has a coupling-out area 11 via which light 21 is coupled out having a substantially constant intensity. By way of example, an intensity profile 22 is shown which substantially has an equal intensity over the longitudinal extension of the light guide 1 along the longitudinal axis 10. In the end region 13 of the light guide 1, an end face 16 closes off the light guide 1 so that the intensity of the intensity profile 22 changes along the longitudinal axis 10 when it reaches the end face 16.

For coupling out the coupled-in light 21 via the coupling-out area 11 there is a prism structure 20 which is provided opposite the coupling-out area 11. According to the principle of total reflection, the light 21 is guided through the light guide 1 at the interfaces of the light guide 1 along the longitudinal axis 10, wherein upon impingement of the light on the prism structure 21, a critical angle for total reflection on the opposite coupling-out area 11 is not reached, so that the light finally decouples via this surface. The principle of the direct coupling-out across an interface also takes place via the end face 16 so that via the inclined surface transverse to the longitudinal extension of the light guide 1, a higher output intensity of the coupled-out light 21 is created. To avoid this, according to the invention, various forms of anti-reflection areas 15 are shown by way of example on the end face 16.

To this end, FIG. 1 shows an anti-reflection area 15, which is produced over the entire surface of the end face 16. The darkening with the laser beam 14, which is provided by the laser beam source 19 shown schematically, is performed completely and over the entire area so that at the threshold of the end face 16 and upon reaching the end face 16, the intensity profile 22 falls to zero from a continuous, constant value over the extent of the coupling-out area 11. The anti-reflection area 15 is formed by an oxidation process by means of an interaction between the laser radiation 14 and the material of the light guide 1, for example, made of polycarbonate.

FIG. 2 shows an exemplary embodiment of the anti-reflection area 15 on the end face 16 of the light guide 1, which are arranged in the form of lines. This creates a line structure 17, and parts of the coupled-in light 21 are absorbed by the darkened lines of the line structure 17 and between the lines, the light can be coupled out via the end face 16 without alteration. This makes possible a partial permeability of coupled-in light 21 for coupling out via the end face 16.

FIG. 3 shows an exemplary embodiment of the light guide 1 with an anti-reflection area 15 on the end face 16, which comprises a dot pattern 18. The dots form darkened areas, which lead to an anti-reflection effect of the coupled-in light 21 so that the proportion of light which is incident on the dots of the dot pattern 18 is absorbed, and the proportion of light which occurs in the intermediate areas between the dots of the dot pattern 18 is reflected. This results in a slow decrease of the intensity in the intensity profile 22 over the end face 16.

The exemplary embodiments shown in respect of the formation of the cover 13 by an anti-reflection area 15 generated by laser radiation 14 are based on a full-area or partial darkening of the shown end face 16 of the light guide 1. It is also conceivable to generate the shown anti-reflection area 15 on the inside in the material of the light guide 1, i.e., preferably in the end region 12 of the light guide 1.

The end region 12 forms the so-called cold, not fired end of the light guide 1, and in order to avoid uncontrollable reflexes resulting from partial total reflection on the end face 16, according to the invention, the cover 13 is formed by a surface blackened by laser radiation. The inventive design of the cover 13 by an anti-reflection area 15 formed with laser radiation 14 causes, in addition to preventing cover in the form of individual parts, that the light guide 1 is harnessed over its entire length. The end region 12 of the light guide 1 does not have to be guided behind a cover so that the end region 12 is no longer visible from outside the lighting device. With its free, cold, non-fired end, the light guide 1 may terminate in an area which is visible from the outside of the lighting device.

Besides being able to machine an end face 16 of the light guide 1 with laser radiation 14, other areas of the light guide can also be machined with laser radiation 14 to bring about darkening. These areas may be, for example, bending areas or transition areas of the light guide 1; that is, generally areas of coupled out light can be equipped with increased intensity with the anti-reflection area 15 of the invention.

The examples of the linear structure 17 and the dot pattern 18 only show the ability to also vary the degree of darkness; for example, through appropriate parameterization of the laser beam source 19, a uniform degree of darkening can be produced over the surface, which ranges between 0% to 100%. This way, an inherently homogeneous partial darkening can be achieved that, similar to the line structure or the dot pattern, partially or proportionately permits a partial reflection.

Additional components, for example, materials for covering the inhomogeneously illuminated light guide, which possibly reflect and/or are coated in a reflex dampening manner, can thereby be omitted.

An additional coating of the outer surface of the light guide near the end is not necessary, that is, for example, shielding by partial darkening or a light exit surface of the light guide or by a reflective layer, can be omitted. Refractive index transitions that result in an incomplete reflection reduction are prevented. A reflection reducing effect can also be achieved continuously in the interior of the light guide volume.

The invention is not limited in its embodiment to the above-described preferred exemplary embodiment. Rather, a number of variants are conceivable, which make use of the described solution even for fundamentally different embodiments. All features and/or advantages arising from the claims, the description or the drawings, including design details, spatial arrangements and process steps, can be essential to the invention both individually and in various combinations.

What is claimed is:

1. A light guide for a lighting device, the light guide comprising:
    a coupling-out area that extends over a longitudinal axis from which light is adapted to be emitted along the longitudinal axis, the light guide extending along the longitudinal axis,
    a prism structure that extends over the longitudinal axis of the light guide on an opposite side of the light guide as the coupling-out area; and
    an end region arranged on one end of the longitudinal axis of the light guide, the end region having a laser-machined cover to prevent light emission of higher intensity in the end region, the laser-machined cover being formed by laser machining a material of the light guide in the end region of the light guide,
    wherein the laser-machined cover is an anti-reflection area that primarily absorbs light on an interior-facing side of the laser-machined cover,
    wherein an entirety of the light guide is monolithic and formed of a same material, and
    wherein the laser-machined cover is inclined with respect to the longitudinal axis of the light guide, such that an intensity profile of the light emission being coupled out of the coupling-out area is continuously constant along the longitudinal axis of the light guide until reaching the laser-machined cover, wherein the intensity profile of the light emission gradually tapers down to zero upon reaching the laser-machined cover.

2. The light guide according to claim 1, wherein the anti-reflection area is formed on one end face in the end region of the light guide, the one end face being inclined with respect to the longitudinal axis of the light guide, such that the laser-machined cover is inclined.

3. The light guide according to claim 1, wherein the anti-reflection area is formed internally in the material of the light guide adjacent to the end region.

4. The light guide according to claim 1, wherein the anti-reflection area is produced by an oxide layer on or in the material of the light guide formed by the laser machining.

5. The light guide according to claim 1, wherein the anti-reflection area forms a partial surface of an end face.

6. The light guide according to claim 1, wherein the anti-reflection area has a structuring.

7. The light guide according to claim 6, wherein the structuring is a line structure or a dot pattern.

8. A method for forming a cover for a light guide for a lighting device, the cover being provided in an end region of the light guide to prevent light emission of a higher intensity in the end region, the method comprising:
    providing the light guide, an entirety of the light guide being monolithic and formed of a same material, the light guide having a coupling-out area that extends over a longitudinal axis from which light is adapted to be emitted along the longitudinal axis, the light guide extending along the longitudinal axis, and the light guide having a prism structure that extends over the longitudinal axis of the light guide on an opposite side of the light guide as the coupling-out area;
    providing a laser beam; and
    laser machining the light guide material in the end region of the light guide to produce the cover, the cover being an anti-reflection area that primarily absorbs light on an interior-facing side of the cover,
    wherein the cover is inclined with respect to the longitudinal axis of the light guide, such that an intensity profile of the light emission being coupled out of the coupling-out area is continuously constant along the longitudinal axis of the light guide until reaching the cover, wherein the intensity profile of the light emission gradually tapers down to zero upon reaching the cover.

9. The method according to claim 8, wherein an interaction of the laser beam with the light guide material is created.

10. A light guide for a lighting device, the light guide comprising:
    a coupling-out area that extends over a longitudinal axis from which light is adapted to be emitted along the longitudinal axis, the light guide extending along the longitudinal axis,
    a prism structure that extends over the longitudinal axis of the light guide on an opposite side of the light guide as the coupling-out area; and
    an end region arranged on one end of the longitudinal axis of the light guide, the end region having a laser-machined cover to prevent light emission of higher intensity in the end region, the laser-machined cover being formed by laser machining a material of the light guide in the end region of the light guide,
    wherein the laser-machined cover is an anti-reflection area that absorbs light on an interior-facing side of the laser-machined cover,
    wherein an entirety of the light guide is monolithic and formed of a same material,
    wherein the anti-reflection area is formed on one end face in the end region of the light guide, and
    wherein the one end face is provided with anti-reflective lines such that the light is absorbed by the anti-reflective lines and in areas between the anti-reflective lines, the light is coupled out of the one end face.

11. The method according to claim 8, wherein the anti-reflection area is formed on one end face in the end region of the light guide, the one end face being inclined with respect to the longitudinal axis of the light guide, such that the cover is inclined.

* * * * *